(12) United States Patent
Ohrbom et al.

(10) Patent No.: US 7,060,357 B2
(45) Date of Patent: Jun. 13, 2006

(54) POWDER COATINGS CONTAINING SYMMETRICAL ADDITIVES

(75) Inventors: Walter H. Ohrbom, Hartland Township, MI (US); David J. Law, Livonia, MI (US); Robert D. Weise, Harper Woods, MI (US); James A. Laugal, White Lake, MI (US)

(73) Assignee: BASF Corporation, Southfield, MI (US)

( * ) Notice: Subject to any disclaimer, the term of this patent is extended or adjusted under 35 U.S.C. 154(b) by 112 days.

(21) Appl. No.: 10/265,036

(22) Filed: Oct. 4, 2002

(65) Prior Publication Data

US 2004/0068054 A1 Apr. 8, 2004

(51) Int. Cl.
*B32B 27/40* (2006.01)
*B32B 27/42* (2006.01)
*C08L 75/04* (2006.01)

(52) U.S. Cl. .................. 428/423.1; 525/123; 525/127; 525/157; 525/162; 525/163; 525/934

(58) Field of Classification Search ................ 525/162, 525/157, 163, 123, 127, 934
See application file for complete search history.

(56) References Cited

U.S. PATENT DOCUMENTS

| 3,980,733 | A | 9/1976 | Isaksen et al. |
|---|---|---|---|
| 4,102,943 | A | 7/1978 | Isaksen et al. |
| 4,190,715 | A | 2/1980 | Isaksen et al. |
| 5,292,833 | A | 3/1994 | Grahe et al. |
| 5,321,103 | A | 6/1994 | Renner |
| 5,336,566 | A | 8/1994 | Rehfuss |
| 5,552,487 | A | 9/1996 | Clark et al. |
| 5,665,852 | A | 9/1997 | Singh et al. |
| 5,777,048 | A | 7/1998 | Ohrbom et al. |
| 6,140,430 | A | 10/2000 | Ruth et al. |
| 6,150,465 | A | 11/2000 | Harris et al. |
| 6,165,618 | A * | 12/2000 | Ohrbom et al. .......... 428/423.1 |
| 6,245,855 | B1 * | 6/2001 | Swarup et al. .............. 525/157 |
| 6,316,109 | B1 | 11/2001 | Ambrose et al. |
| 6,391,968 | B1 * | 5/2002 | Ohrbom et al. ............. 525/162 |
| 6,441,103 | B1 | 8/2002 | Ambrose et al. |
| 6,451,928 | B1 * | 9/2002 | Ambrose et al. ........... 525/443 |
| 6,624,241 | B1 * | 9/2003 | Weise et al. ................ 524/591 |
| 2002/0028879 | A1 | 3/2002 | Chasser et al. |
| 2004/0054083 | A1 * | 3/2004 | Campbell ................... 525/157 |

FOREIGN PATENT DOCUMENTS

| EP | 0 604 922 | 12/1993 |
|---|---|---|
| WO | WO 00/36035 | 6/2000 |

OTHER PUBLICATIONS

English Translation of the International Search Report for No. PCT/US 03/23221, International Filing date Jul. 25, 2003.

* cited by examiner

*Primary Examiner*—Jeffrey B. Robertson

(57) ABSTRACT

A coating composition contains solid particulates of a mixture of an aminoplast crosslinking agent, a solid polymer having functionality reactive with the aminoplast crosslinking agent, and a crystalline, carbamate-functional additive. The crystalline, carbamate-functional additive has a melting point of at least about 30° C. and is up to about 15% by weight of the powder coating composition.

27 Claims, No Drawings

POWDER COATINGS CONTAINING SYMMETRICAL ADDITIVES

FIELD OF THE INVENTION

This invention concerns thermoset powder coating compositions, especially for automotive vehicles.

BACKGROUND OF THE INVENTION

Powder coating compositions have become increasingly important because they give off very little or no volatile material to the environment when cured. Typically, any such emissions are limited to by-products of the curing reaction, such as blocking agents or volatile condensation products. Powder coatings have found use as both decorative coatings and protective coatings.

Clearcoat-basecoat composite coatings are widely used in the coatings art and are notable for desirable gloss, depth of color, distinctness of image and/or special metallic effects. Composite systems are particularly utilized by the automotive industry to achieve a mirror-like, glossy finish with a high depth of image.

It is important for topcoats, including the clearcoat-basecoat composite coatings, to provide the desired color. When electrocoat primers are used, amine from the electrocoat primer layer may migrate during thermal cure of later applied coating layers causing undesirable yellowing in those layers. The migration and yellowing increase with longer cure times or higher cure temperatures, thus making shorter cure times and lower cure temperatures desirable for preventing or minimizing yellowing of the later applied coating layers. Yellowing of the later applied coating layers may also be caused by volatilization of amino blocking groups, e.g. amino blocking groups of an isocyanate, or by volatilization of salting amines from waterborne compositions of a lower layer, e.g. salting amines of waterborne basecoat compositions that may cause yellowing of a clearcoat applied over the basecoat composition.

Ruth et al., U.S. Pat. No. 6,140,430 describes an epoxy powder coating containing a non-crystalline epoxy resin, a small amount of a crystalline epoxy agent, a curing agent reactive with epoxy groups, and a catalyst. The crystalline epoxy resin has a melting point preferably greater than 90° C. It is included in the powder coating in an amount sufficient to reduce the coating viscosity during curing so that air entrapped in the powder particles, which would otherwise be entrapped as bubbles and causing haze in the coating, can escape.

Clark et al., U.S. Pat. No. 5,552,487 describes a thermoset powder coating composition including a crystalline compound with a melting point between 30° C. and 150° C. as a flow control and leveling agent. The patent provides as examples of the crystalline compound trimethylolpropane, neopentyl glycol, 2,5-dimethyl-2,5-hexanediol, 2,4,6-triphenylphenol, 2,2'-biphenol, 9-phenanthrol, and para-cresol.

Carbamate- and urea-functional materials have recently been widely used in automotive coatings to achieve the durability of polyurethane coatings while avoiding use of expensive, blocked polyisocyanates that require a relatively high curing temperature or use of unblocked polyisocyanates that are water-sensitive and must be mixed into the coating only prior to application. Harris et al., U.S. Pat. No. 6,150,465 discloses a slurry coating composition that includes solid particles containing a carbamate- or urea-functional compound dispersed in a liquid phase including a crosslinking component, such as a melamine formaldehyde resin. The carbamate- or urea-functional compound of the solid particles has a glass transition temperature greater than 40° C. While melting points are sharp, glass transitions such as for the Harris carbamate- or urea-functional compounds are diffuse, occurring over a temperature range. Ambrose et al., U.S. Pat. No. 6,316,109, discusses the problem of "gassing" that occurs as a result of vaporization of the alcohol generated in thermal cure with aminoplast crosslinkers.

SUMMARY OF THE INVENTION

A coating composition for automotive exterior coatings of the present invention contains solid particulates of a mixture of an aminoplast crosslinking agent, a solid polymer having functionality reactive with the aminoplast crosslinking agent, and a crystalline, carbamate-functional additive. The crystalline, carbamate-functional additive has a melting point of at least about 30° C. The curing temperature of the coating composition is selected to be above the melting point of the crystalline additive. The coating composition contains preferably up to about 25% by weight, more preferably up to about 15% by weight, of the carbamate-functional additive.

When used in connection with the invention, the term "carbamate" refers to a group having a structure

in which R is H or alkyl. Preferably, R is H or alkyl of from 1 to about 4 carbon atoms, and more preferably R is H.

The coating composition provides a cured coating layer with excellent leveling and smoothness that results from improved flow of the coating during the baking and curing step. The crystalline additive also serves as a degassing agent, which is especially useful for preventing bubbling or popping from the by-products of reaction of the aminoplast crosslinking agent.

"A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates a possible variation of up to 5% in the value.

DETAILED DESCRIPTION OF THE PREFERRED EMBODIMENTS

The following description of the preferred embodiment(s) is merely exemplary in nature and is in no way intended to limit the invention, its application, or uses.

The aminoplast crosslinking agent is reactive with both the solid polymer and the crystalline, carbamate-functional additive. Useful examples of aminoplast crosslinking agents include, without limitation, aldehyde condensates of glycoluril, particularly in which the aldehyde is acetaldehyde, crotonaldehyde, benzaldehyde, or combinations of these; combinations of a liquid or semi-liquid etherified aminoplast resin and a solid condensation polymer of urea or melamine and formaldehyde as disclosed in Renner, U.S. Pat. No. 5,321,103, the disclosure of which is incorporated herein by reference; solid reaction products of aminoplasts with aliphatic alcohols and materials that contain alcohol and/or amides as disclosed in Isaksen, U.S. Pat. Nos. 3,980,733, 4,102,943, and 4,190,715 the disclosures of which are incorporated herein by reference; solid, ungelled reaction products of aminoplasts and carbamate functional materials as disclosed in Ohrbom, U.S. Pat. No. 5,777,048 and Singh, U.S. Pat. No. 5,665,852, the disclosures of which are incorporated herein by reference; solid reaction products of aminoplasts with secondary carbamate functional polyesters as disclosed in Ambrose, U.S. Pat. No. 6,441,103, the disclosure of which is incorporated herein by reference; and reaction products having benzoxazine groups of an (alkoxyalkyl)aminotriazine compounds with one or more amino groups and polyhydric aromatic compounds, as described in Ambrose et al., U.S. Pat. No. 6,316,109, the disclosure of which is incorporated herein by reference. The aminoplast crosslinking agent may be including in the coating composition in amounts of from about 0.8 to about 2 equivalents, preferably from about 0.9 to about 1.2 equivalents for each equivalent of groups reactive with the aminoplast crosslinking agent.

The solid polymer having functionality reactive with the aminoplast crosslinking agent has a glass transition sufficiently high to provide a powder coating with the desired storage stability. The glass transition temperature should be at least about 30° C., preferably at least about 60° C., and more preferably at least about 65° C. The glass transition temperature is typically up to about 130° C., preferably up to about 110° C., and more preferably up to about 90° C. The functionality reactive with the aminoplast crosslinking agent includes, without limitation, hydroxyl, carbamate, urea, carboxyl, anhydride, epoxide, phenolic, and amine functional groups. The polymer may, of course, have a combination of these functional groups.

The polymer may be of any of the kinds of polymers typically used in thermoset coating compositions, including, without limitation, acrylic polymers, polyurethane polymers, polyester polymers, epoxies, and so on. Particularly preferred are polyesters and acrylic polymers having carbamate and/or hydroxyl groups. The preparation of such polymers is well-documented in the art and need not be described here in further detail.

The crystalline, carbamate-functional additive has a melting point of at least about 50° C., more preferably at least about 80° C. Suitable examples of crystalline, carbamate-functional additives include, without limitation, those symmetrical carbamate-functional compounds having $C_2$ and higher symmetry. The carbamate-functional compound with $C_2$ or higher symmetry may be represented by the formula R(X)$_y$ with X representing a carbamate functional group and $y \geq 2$.

As used herein, a molecule with symmetry means that certain parts of the molecule can be interchanged, via a symmetry operation, with others without altering either the identity or the orientation of the molecule.

Symmetry operations are geometrically defined ways of exchanging equivalent parts of a molecule. However, such operations are symmetry operations if, and only if, the appearance of the molecule is exactly the same relative to the pre- and post-symmetry operation view. Thus, the term "symmetrical" as used herein refers to a molecule having a three-dimensional structure that is identical relative to the pre- and post-symmetry operation views. Put another way, "[a] molecule possesses a symmetry element if the application of the operation generated by the element leaves the molecule in an indistinguishable state." *Molecular Symmetry and Group Theory*, Alan Vincent, Wiley & Sons, NY, 1977, reprinted 1981, page 21, hereby incorporated by reference.

The instant application is concerned only with proper rotation symmetry operations. Proper rotation, also referred to as "$C_n$", refers to simple rotation about an axis passing through the molecule by an angle $2\pi/n$ or an angle $360°/n$. A molecule is said to have a $C_n$ symmetry element if after undergoing a proper rotation $C_n$ operation, it's appearance is indistinguishable from it's appearance prior to undergoing the proper rotation $C_n$ operation, irrespective of conformational isomers. Put another way, a molecule possesses a symmetry element, in this case $C_n$, when one or more of its conformational isomers possesses that symmetry element. The highest symmetry element that belongs to any conformational isomer of the molecule is assigned to the molecule.

While it may be appreciated that all molecules have $C_n$ symmetry where n is 1, the instant application is only concerned with R groups also having $C_n$ symmetry where n is 2 or higher. R may be an aliphatic, a cycloaliphatic, or an aromatic group-containing structure having the required $C_n$ symmetry. R may further comprise additional functional groups so long as the symmetry of R is maintained. For example, R may comprise functional groups comprising single, double, and/or triple bonds with atoms such as C, H, S, O, N and mixtures thereof. Illustrative examples of additional functional groups include ureas, ethers, esters, carbonates, and the like.

In the absence of additional functional groups, examples of illustrative R groups include —$C_4H_8$— and —$C_6H_{12}$—. Illustrative examples of suitable crystalline, carbamate-functional additives include, without limitation,

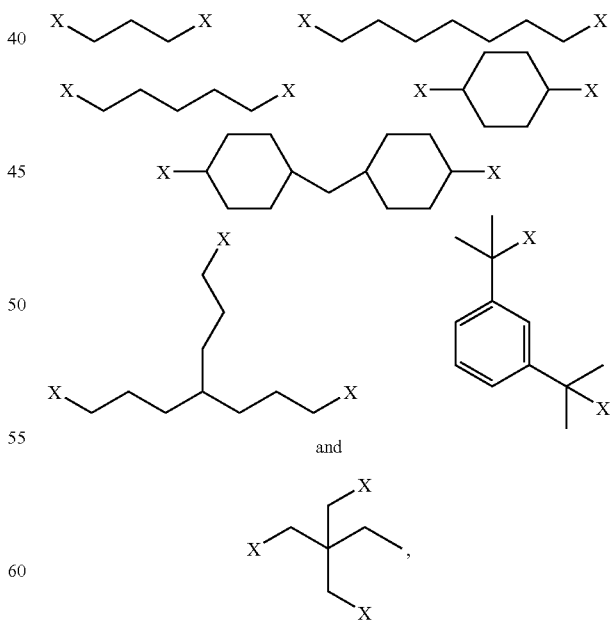

where "X" is in each case a group having a carbamate group.

Examples of R groups comprising additional functional groups include ureas such as

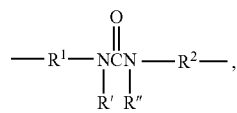

ethers such as —R¹—O—R²—, and linear carbonates such as

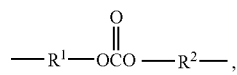

wherein $R^1$ and $R^2$ are identical and are selected from the group consisting of alkylene or cycloalkylene groups having at least four carbons, and R' and R" are identical and are hydrogens or $C_1$–$C_4$ alkyl groups. It will be appreciated that in each case, $R^1$ and $R^2$ are linked to terminal carbamate groups.

$R^1$ and $R^2$ may have, but are not required to have, $C_n$ symmetry, so long as $R(X)_y$ has the required $C_n$ symmetry wherein n is 2 or higher. Preferably, $R^1$ and $R^2$ will be an alkylene group having from four to 12 carbons and most preferably, will be an alkylene group having from four to eight carbons. Examples of illustrative $R^1$ and $R^2$ groups include —$C_4H_8$— and —$C_6H_{12}$—. A particularly preferred group is —$C_6H_{12}$—.

Examples of suitable crystalline, carbamate-functional additives include, without limitation, the reaction products of symmetrical polyisocyanates and hydroxy carbamate compounds, such as the reaction products of ethylene diisocyanate, 1,3-diisocyanatopropane, 1,4-butylene diisocyanate, diphenylmethane 4,4'-diisocyanate, methylenebis-4,4'-isocyanatocyclohexane, 1,6-hexamethylene diisocyanate, p-phenylene diisocyanate, 1,12-dodecamethylene diisocyanate, cyclohexane-1,4-diisocyanate, isocyanurates of these diisocyanates, triisocyanates such as 4,4',4"-triphenylmethane triisocyanate, 1,3,5-benzene triisocyanate and 2,4,6-toluene triisocyanate, and so on with hydroxyethyl carbamate or hydroxypropyl carbamate or hydroxybutyl carbamate.

Preferably, $R^4$ will comprise a $C_2$–$C_{12}$ aliphatic group or cycloaliphatic group. Examples of preferred $R^4$ groups are hexane radicals, butane radicals, and 1,4-dimethylcyclohexane radicals. Most preferably, $R^4$ will be butylene or hexylene.

The crystalline, carbamate-functional additive is included in the powder coating in an amount sufficient to reduce the melt viscosity of the powder coating at the temperature at which the powder coating is cured (that is, relative the melt viscosity of a comparative powder coating having the same composition except without the crystalline, carbamate-functional additive). Preferably, the melt viscosity is reduced a sufficient amount to prevent popping defects in the cured coating. In a preferred embodiment a sufficient amount of the crystalline, carbamate-functional additive is included in the powder coating to obtain a desired improvement in at least one of these properties: smoothness of the coatings, gloss of the coating, and/or metal control of the coating. The amount of the crystalline, carbamate-functional additive in the powder coating is preferably limited to an amount that will not cause sintering during storage of the powder coating and that will be suitable for melt processing during manufacture of the powder coating. While the optimum amount of crystalline, carbamate-functional additive included in the powder coating depends upon the particular additive selected, and may be determined by straightforward experimentation, in general the crystalline, carbamate-functional additive is included in the powder coating in amounts of from about 5% by weight to about 25% by weight, particularly from about 5% by weight to about 15% by weight. Preferably, the amount of crystalline, carbamate-functional additive in the powder coating composition is chosen so that the powder coating composition has a desired shelf-life (i.e., continues a desired length of time without the powder sintering to such a degree that it becomes unusable).

The relative amounts of the solid aminoplast crosslinking agent and the combination of the materials reactive with the aminoplast crosslinking agents, including the solid polymer and the crystalline, carbamate-functional additive, is from about 0.5 to about 3.0 equivalents of the aminoplast crosslinking agent for each equivalent of materials reactive therewith.

It may be desirable to incorporate into the powder coating composition other materials, such as fillers, pigments, leveling agents to help coalesce the film, plasticizers, air release agents such as benzoin, flow agents such as poly(butyl acrylates) and poly(2-ethylhexyl acrylates), hindered amine light stabilizers and ultraviolet light absorbers, antioxidants, and/or catalysts. Moreover, a texturing agent may also be included, for example to more finely adjust the degree of texture.

Pigments and fillers may be utilized in amounts typically of up to 40% by weight, based on total weight of the coating composition. The pigments used may be inorganic pigments, including metal oxides, chromates, molybdates, phosphates, and silicates. Examples of inorganic pigments and fillers that could be employed are titanium dioxide, barium sulfate, carbon black, ocher, sienna, umber, hematite, limonite, red iron oxide, transparent red iron oxide, black iron oxide, brown iron oxide, chromium oxide green, strontium chromate, zinc phosphate, silicas such as fumed silica, calcium carbonate, talc, barytes, ferric ammonium ferrocyanide (Prussian blue), ultramarine, lead chromate, lead molybdate, aluminum pigments, and mica flake pigments. Organic pigments may also be used. Examples of useful organic pigments are metallized and non-metallized azo reds, quinacridone reds and violets, perylene reds, copper phthalocyanine blues and greens, carbazole violet, monoarylide and diarylide yellows, benzimidazolone yellows, tolyl orange, naphthol orange, and the like.

Hindered amine light stabilizers, ultraviolet light absorbers, and anti-oxidants may be added in ways and amounts known to the art to augment the durability of the finished coating, and are particularly useful when the finished coating may be subjected to outdoor exposure.

The thermosetting powder coating compositions can be prepared by first melt blending the ingredients of the coating compositions. This process usually involves dry blending the ingredients in a planetary mixer and then melt blending the admixture in an extruder at a suitable temperature. The extrusion temperature is preferably chosen so that it is high enough to allow the resin to melt to a viscosity that produces good mixing and pigment wetting, but is not so high that any significant amount of co-reaction between resin and crosslinker occurs. The melt blending is usually carried out within the range of from 80° C. to 130° C.

The extrudate is then cooled and pulverized. The extrudate may be crushed to a fine flake or granule and then ground by typical methods employed in the art, and classified by sieving or other means. The maximum particle size and the particle size distribution are controlled in the classifying step and affect the smoothness of the final film. Requirements for these parameters depend upon the particular use and application method.

The thermosetting powder coating composition can be applied onto many different substrates, including metal substrates such as bare steel, phosphated steel, galvanized steel, or aluminum; and non-metallic substrates, such as plastics and composites. The substrate may also be any of these materials having upon it already a layer of another coating, such as a layer of an electrodeposited primer, cured or uncured before the application of the powder coating compositions. The powder coating composition may be applied to a coil substrate or a shaped substrate, such as automotive vehicle bodies, appliances, satellite dishes, brown goods (e.g., stereo cases), computer cases, office furniture and office machines such as copy machines, typewriters, printers, filing cabinets, desks, and bookcases; staplers, hole punchers, non-slip (non-skid) exterior surfaces that may benefit from the textured finish; architectural elements; and automotive vehicle components.

Application can be by electrostatic spraying or by use of a fluidized bed. Electrostatic spraying is the preferred method. The coating powder can be applied in one or more passes to provide a film thickness after cure of from 25 to 400 microns. The substrate can optionally be preheated prior to application of a powder coating composition to promote uniform and thicker powder deposition. The powder coating may be applied in a coil coating process.

After application of the coating composition to the substrate, the coating is cured, preferably by heating at a temperature and for a length of time sufficient to cause the reactants to form an insoluble polymeric network. The cure temperature is usually from about 145° C. to about 205° C., and the length of cure is usually about 15 minutes to about 60 minutes. Preferably, the coating is cured at about 150° C. to about 180° C. for about 20 to about 30 minutes. Heating can be done in infrared and/or convection ovens.

The powder coating composition of the invention can be formulated as a primer coating composition, including a color-keyed primer coating composition, a single layer topcoat coating composition, a basecoat coating composition, or a clearcoat coating composition. Basecoat coating compositions include appropriate pigments to provide the desired color and/or special effect to the coating layer. Clearcoat coating compositions do not include opaque pigments.

In one embodiment of the invention, a composite coating of the invention has one layer, preferably a primer coating layer, that is obtained by reaction of the powder coating composition of the invention. The composite coating has a topcoat layer, which may include basecoat coating layer applied over the primer coating layer and an outer, clearcoat layer applied over the basecoat coating layer. One of the topcoat layer, basecoat layer, or clearcoat layer may be obtained from a powder coating composition according to the invention in addition to, or instead of, the primer layer.

The primer coating composition according to the invention is applied directly to the substrate or over one or more other layers of primer, such as the electrocoat primer. The applied primer coating composition is then cured to form a primer coating layer. The electrocoat primer or other first layer of primer may be cured at the same time as the primer coating layer of the invention in a process known as "wet-on-wet" coating. The primer coating layer formed from the primer coating composition of the invention is the outermost primer layer of the composite coating. In some applications, such as inside automotive deck lids, engine compartments, inside hoods, and in door jambs, the powder coating composition of the invention forms the outermost layer of coating, preferably being applied over a cured or uncured layer of electrocoat primer.

A topcoat composition is applied over the primer coating layer and cured to form a topcoat layer. The substrate at that point is then covered with a composite coating that has at least one layer of primer coating derived from the inventive compositions and at least one layer of topcoat. Alternatively, the topcoat layer may be derived from the inventive compositions in addition to, or instead of, the primer layer. In a preferred embodiment, the primer layer is overcoated with a topcoat applied as a color-plus-clear (basecoat-clearcoat) topcoat. In a basecoat-clearcoat topcoat, an underlayer of a pigmented coating, the basecoat, is covered with an outer layer of a transparent coating, the clearcoat. Basecoat-clearcoat topcoats provide an attractive smooth and glossy finish and generally improved performance.

Crosslinking compositions are preferred as the topcoat layer or layers when such layers are not a composition of the invention. Coatings of this type are well-known in the art and include waterborne compositions as well as solvent-borne compositions. For example, the topcoat may be a clearcoat according to U.S. Pat. No. 5,474,811, applied wet-on-wet over a layer of a basecoat composition. Polymers known in the art to be useful in basecoat and clearcoat compositions include, without limitation, acrylics, vinyl, polyurethanes, polycarbonates, polyesters, alkyds, and polysiloxanes. Acrylics and polyurethanes are preferred. Thermoset basecoat and clearcoat compositions are also preferred, and, to that end, preferred polymers comprise one or more kinds of crosslinkable functional groups, such as carbamate, hydroxy, isocyanate, amine, epoxy, acrylate, vinyl, silane, acetoacetate, and so on. The polymer may be self-crosslinking, or, preferably, the composition may include a crosslinking agent such as a polyisocyanate or an aminoplast resin of the kind described above. In one embodiment, waterborne basecoat compositions and/or clearcoat compositions having low volatile organic content are used. The waterborne basecoat and waterborne clearcoat compositions each preferably has a volatile organic content of less than about 1.5, more preferably less than about 1.3, and even more preferably less than about 0.7.

Each layer of the composite coatings of the invention can be applied to an article to be coated according to any of a number of techniques well-known in the art. These include, for example, spray coating, dip coating, roll coating, curtain coating, and the like. If an initial electrocoat primer layer is applied to a metallic substrate, the electrocoat primer is applied by electrodeposition. For automotive applications, the primer coating layer and the topcoat layer or layers are preferably applied by spray coating, particularly electrostatic spray methods. Coating layers of one mil or more are usually applied in two or more coats, separated by a time sufficient to allow some of the solvent or aqueous medium to evaporate, or "flash," from the applied layer. The flash may be at ambient or elevated temperatures, for example, the flash may use radiant heat. The coats as applied can be from 0.5 mil up to 3 mils dry, and a sufficient number of coats are applied to yield the desired final coating thickness.

The outermost primer layer may be cured before the topcoat is applied. The cured primer layer may be from about 0.5 mil to about 2 mils thick, preferably from about 0.8 mils to about 1.2 mils thick. Color-plus-clear topcoats are usually applied wet-on-wet. The compositions are applied in coats separated by a flash, as described above, with a flash also between the last coat of the color composition and the first coat the clear. The two coating layers are then cured simultaneously. Preferably, the cured basecoat layer is 0.5 to 1.5 mils thick, and the cured clear coat layer is 1 to 3 mils, more preferably 1.6 to 2.2 mils, thick. Alternatively the primer layer and the topcoat can be applied "wet-on-wet." For example, the primer composition can be applied, then the applied layer flashed; then the topcoat can be applied and flashed; then the primer and the topcoat can be cured at the same time. Again, the topcoat can include a basecoat layer and a clearcoat layer applied wet-on-wet. The invention is further described in the following example. The examples are merely illustrative and do not in any way limit the scope of the invention as described and claimed. All parts are parts by weight unless otherwise noted.

EXAMPLE 1A

Preparation of Crystalline Additive Material

A mixture of 38.9 parts by weight of anhydrous methyl ethyl ketone and 40 parts by weight of the isocyanurate of hexamethylene diisocyanate was heated to 63° C. under an inert atmosphere. At that temperature, 0.02 parts by weight of dibutyl tin dilaurate were first added, followed by 20.4 parts by weight of hydroxyethyl carbamate, added in a series of small increments. The reaction temperature was allowed to reach 75° C. during the hydroxyethyl carbamate additions. The reaction temperature was held at 75° C. until all of the hydroxyethyl carbamate was reacted. A small amount, 0.7 parts by weight, of isobutanol was then added. When the reaction was complete, the solvent medium and excess isobutanol was removed by vacuum distillation to obtain a hard, crystalline solid product.

EXAMPLE 1B

Powder Coating According to the Invention

The following materials were dry blended for about a minute: 125.2 parts by weight of Example 1A, 41.3 parts by weight of Powderlink 1174 (a solid glycoluril material obtained from Cytec), 715.9 parts by weight of Joncryl 587 (an hydroxyl-functional acrylic obtained from S. C. Johnson), 4.7 parts by weight of benzoin, 0.8 parts by weight of MTSI catalyst (a blocked sulfonic acid catalyst obtained from Cytec), 3.3 parts by weight of Resiflow PL-200 (obtained from Estron), 0.7 parts by weight of Powderlink SCA 100, 87.1 parts by weight of titanium dioxide pigment, 0.2 parts by weight of carbon black pigment, and 16.7 parts by weight of barium sulfate extender. The dry blend was processed at 250 RPM through a ZSK-30 twin screw extruder (obtained from Werner & Pfleiderer) having a first zone temperature of 110° C. and a second zone temperature of 120° C. The extrudate was cooled and pulverized, then classified with a 200 mesh sieve to produce a powder coating.

The powder coating was applied to a steel substrate using an electrostatic spray gun. The applied coating was cured in a convection oven at 340° F. for 20 minutes.

The invention has been described in detail with reference to preferred embodiments thereof. It should be understood, however, that variations and modifications can be made within the spirit and scope of the invention.

What is claimed is:

1. A powder coating composition, comprising solid particulates of a mixture of an aminoplast crosslinking agent, a solid polymer having functionality reactive with the aminoplast crosslinking agent, and a crystalline, carbamate-functional material having a melting point of at least about 30° C. in an amount sufficient to reduce the powder coating composition's melt viscosity at curing temperature, wherein the powder coating composition provides a smooth, cured coating.

2. A powder coating composition according to claim 1, wherein the crystalline, carbamate-functional material is up to about 25% by weight of the powder coating composition.

3. A powder coating composition according to claim 1, wherein the crystalline, carbamate-functional material is up to about 15% by weight of the powder coating composition.

4. A powder coating composition according to claim 1, wherein the aminoplast crosslinking agent comprises a condensate of glycoluril and a member selected from the group consisting of acetaldehyde, crotonaldehyde, benzaldehyde, or combinations thereof.

5. A powder coating composition according to claim 1, wherein the ratio of equivalents of aminoplast crosslinking agent to equivalents of groups reactive with the aminoplast crosslinking agent is from about 0.8 to about 2 equivalents of aminoplast crosslinking agent for each equivalent of groups reactive with the aminoplast crosslinking agent.

6. A powder coating composition according to claim 1, wherein the ratio of equivalents of aminoplast crosslinking agent to equivalents of groups reactive with the aminoplast crosslinking agent is from about 0.9 to about 1.2 equivalents of aminoplast crosslinking agent for each equivalent of groups reactive with the aminoplast crosslinking agent.

7. A powder coating composition according to claim 1, wherein the solid polymer having functionality reactive with the aminoplast crosslinking agent has a glass transition temperature of from about 60° C. to about 130° C.

8. A powder coating composition according to claim 1, wherein the solid polymer having functionality reactive with the aminoplast crosslinking agent has a glass transition temperature of from about 65° C. to about 110° C.

9. A powder coating composition according to claim 1, wherein the solid polymer having functionality reactive with the aminoplast crosslinking agent comprises functionality selected from the group consisting of hydroxyl, carbamate, urea, carboxyl, anhydride, epoxide, phenolic, and amine groups and combinations thereof.

10. A powder coating composition according to claim 1, wherein the solid polymer having functionality reactive with the aminoplast crosslinking agent comprises a member selected from the group consisting of carbamate-functional polyesters, hydroxyl-functional polyesters, carbamate-functional acrylic polymers, hydroxyl-functional acrylic polymers, and combinations thereof.

11. A powder coating composition according to claim 1, wherein the crystalline, carbamate-functional material has a melting point of at least about 50° C.

12. A powder coating composition according to claim 1, wherein the crystalline, carbamate-functional material has a melting point of at least about 80° C.

13. A powder coating composition according to claim 1, wherein the crystalline, carbamate-functional material has $C_2$ or higher symmetry.

14. A powder coating composition according to claim 1, wherein the crystalline, carbamate-functional material has a structure selected from the group consisting of

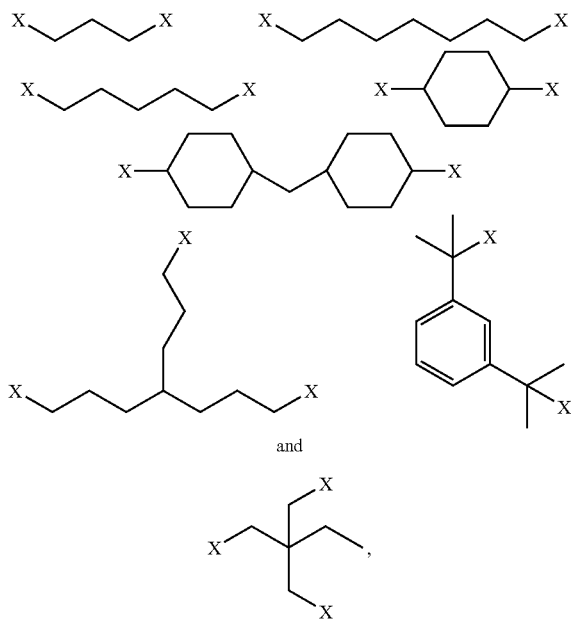

wherein X in each case comprises a carbamate group.

15. A powder coating composition according to claim 1, wherein the crystalline, carbamate-functional material comprises a member selected from the group consisting of the reaction products of symmetrical polyisocyanates and hydroxy carbamate compounds.

16. A powder coating composition according to claim 1, wherein the crystalline, carbamate-functional material comprises a member selected from the group consisting of the reaction products of
(1) an isocyanate compound selected from the group consisting of ethylene diisocyanate, 1,3-diisocyanatopropane, 1,4-butylene diisocyanate, diphenylmethane 4,4'-diisocyanate, methylenebis-4,4'-isocyanatocyclohexane, 1,6-hexamethylene diisocyanate, p-phenylene diisocyanate, 1,12-dodecamethylene diisocyanate, cyclohexane-1,4-diisocyanate, isocyanurates of these diisocyanates, 4,4',4"-triphenylmethane triisocyanate, 1,3,5-benzene triisocyanate, and 2,4,6-toluene triisocyanate and
(2) an hydroxy carbamate compound selected from the group consisting of hydroxyethyl carbamate, hydroxypropyl carbamate, hydroxybutyl carbamate, and combinations thereof.

17. A powder coating composition according to claim 1, wherein the melt viscosity is reduced a sufficient amount to prevent popping defects in the cured coating.

18. A powder coating composition according to claim 1, comprising a sufficient amount of the crystalline, carbamate-functional material so that, relative to a powder % coating composition of the same composition except with none of the carbamate-functional material, the powder coating composition according to claim 1 produces a coating with at least one of (a) higher gloss, (b) improved metal control, and (c) increased smoothness.

19. A powder coating composition according to claim 1, comprising from about 5% by weight to about 25% by weight of the crystalline, carbamate-functional material.

20. A powder coating composition according to claim 1, comprising from about 5% by weight to about 15% by weight of the crystalline, carbamate-functional material.

21. A method of coating a substrate, comprising a step of applying a powder coating composition according to claim 1 to a substrate and curing the applied powder coating composition at the curing temperature to produce a smooth, cured coating.

22. A method according to claim 21, wherein the substrate comprises a member selected from the group consisting of metal, steel coil, phosphated steel, plastics, composites, and these substrates already having a layer of another coating thereon.

23. A method according to claim 21, wherein the powder coating composition is applied as a primer layer, and wherein the method further comprises a step of applying at least one layer of a topcoat coating over the primer layer.

24. A method according to claim 21, wherein the powder coating composition is applied as topcoat layer over a primer layer.

25. A method according to claim 24, wherein the powder coating composition is applied as a basecoat layer, and wherein the method further comprises a step of applying at least one layer of a clearcoat coating over the basecoat layer.

26. A method according to claim 24, wherein the powder coating composition is applied as a clearcoat layer, and wherein the method further comprises a step of applying at least one layer of a basecoat coating directly under the powder coating composition.

27. A composite coating produced according to the method of claim 24.

* * * * *